(12) United States Patent
Marks

(10) Patent No.: US 9,371,417 B2
(45) Date of Patent: *Jun. 21, 2016

(54) CURABLE COMPOSITIONS

(71) Applicant: Blue Cube IP LLC, Midland, MI (US)

(72) Inventor: Maurice J. Marks, Lake Jackson, TX (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/391,725

(22) PCT Filed: May 23, 2013

(86) PCT No.: PCT/US2013/042335
§ 371 (c)(1),
(2) Date: Oct. 10, 2014

(87) PCT Pub. No.: WO2013/188070
PCT Pub. Date: Dec. 19, 2013

(65) Prior Publication Data
US 2015/0087749 A1  Mar. 26, 2015

Related U.S. Application Data

(60) Provisional application No. 61/660,397, filed on Jun. 15, 2012.

(51) Int. Cl.
*C08G 59/24* (2006.01)
*C08G 59/62* (2006.01)
*C08G 59/68* (2006.01)
*C08L 63/00* (2006.01)
*C08K 5/00* (2006.01)
*C08K 5/13* (2006.01)

(52) U.S. Cl.
CPC ............ *C08G 59/621* (2013.01); *C08G 59/245* (2013.01); *C08G 59/68* (2013.01); *C08G 59/685* (2013.01); *C08G 59/687* (2013.01); *C08G 59/688* (2013.01); *C08K 5/0025* (2013.01); *C08K 5/13* (2013.01)

(58) Field of Classification Search
None
See application file for complete search history.

(56) References Cited

U.S. PATENT DOCUMENTS

| | | | | |
|---|---|---|---|---|
| 2,924,580 | A * | 2/1960 | Phillips et al. | 528/408 |
| 6,562,884 | B1 * | 5/2003 | Tang et al. | 523/443 |
| 2014/0256909 | A1 * | 9/2014 | Marks et al. | 528/406 |
| 2015/0087748 | A1 * | 3/2015 | Marks | 523/400 |

FOREIGN PATENT DOCUMENTS

| | | | | |
|---|---|---|---|---|
| GB | 1532592 A | * 11/1978 | | C08L 63/00 |
| WO | WO 2010077484 A1 | * 7/2010 | | C08G 65/00 |

* cited by examiner

*Primary Examiner* — Michael J Feely
(74) *Attorney, Agent, or Firm* — Polsinelli PC

(57) ABSTRACT

A curable composition including (a) at least one divinylarene dioxide; (b) at least one phenol, wherein the phenol is unsubstituted at a 2-, 4-, or 6-phenolic ring position; and (c) at least one acid compound-related cure catalyst; and a cured product made from the above curable composition.

13 Claims, No Drawings

CURABLE COMPOSITIONS

FIELD

The present invention is related to a curable composition including a mixture of a divinylarene dioxide, a phenol, and a cure catalyst.

BACKGROUND

It is known in the art to prepare various curable compositions containing a combination of a divinylarene dioxide, particularly divinylbenzene dioxide (DVBDO), and other compounds such as various phenols and various acidic or basic catalysts that mix with the divinylarene dioxide to form a curable composition.

U.S. Pat. No. 2,924,580, for example, describes curing DVBDO with 2,4,6-tris(dimethylaminomethyl)phenol as a amine catalytic curing agent. 2,4,6-Tris(dimethylaminomethyl)phenol is not a phenol curing agent of the present invention, because this curing agent is substituted at the 2-, 4-, and 6-phenolic ring positions. Therefore, the catalytic curing agent described in U.S. Pat. No. 2,924,580 cannot be alkylated by a divinylarene dioxide.

SUMMARY

The present invention is directed to a curable composition or formulation including a mixture of divinylarene dioxide, a phenol, and a curing catalyst; and curing the curable composition at curing conditions to form a cured product.

One embodiment of the present invention is directed to a curable composition of matter including (a) at least one divinylarene dioxide; (b) at least one phenol, wherein the phenol is unsubstituted at a 2-, 4-, or 6-phenolic ring position with respect to any phenolic hydroxyl group; and (c) at least one acid compound-related cure catalyst, said catalyst being effective in catalyzing the reaction between the divinylarene dioxide and the phenol at both its oxygen and its unsubstituted 2-, 4-, and/or 6-phenolic ring positions.

In other embodiments, other materials such as optional curing agents, optional fillers, optional reactive diluents, optional flexibilizing agents, optional processing aides, and optional toughening agents can be used in the curable composition of the present invention.

A mixture of a divinylarene dioxide, a phenol, and an acid compound-related catalyst is a novel formulation. The use of the phenols, as a new class of curing agents for divinylarene dioxides, provides novel formulations which exhibit a very low viscosity; and which, upon curing, provides a cured product having a high heat resistance. Neither divinylarene dioxides nor other epoxy resins are previously known to be cured by reaction with phenols using an acid compound-related catalyst.

The use of the acid compound-related catalyst is effective in catalyzing the reaction between the divinylarene dioxides and phenols at ambient or higher temperatures. Among the acid compound-related catalysts of use in the present invention are Bronsted acids, Lewis acids, and alkylating esters. Alkylating esters are latent catalysts which provide more stable formulations.

One of the advantages of the present invention over the prior art is preparing a curable composition containing divinylarene dioxides and phenols that have a low viscosity and cure to heat resistant cured compositions.

DETAILED DESCRIPTION

In its broadest scope, the present invention includes a curable composition comprising a mixture of (a) at least one divinylarene dioxide; (b) at least one phenol, wherein the phenol is unsubstituted at a 2-, 4-, or 6-phenolic ring position; and (c) at least one acid compound-related cure catalyst. The curable composition of the present invention can be cured to form a cured composition by exposing the curable composition to either ambient or elevated temperatures.

In one embodiment of the present invention, the divinylarene dioxide useful in the curable composition of the present invention is as described in U.S. patent application Ser. No. 13/133,510.

In another embodiment of the present invention, the divinylarene dioxide useful in preparing the curable composition of the present invention may comprise, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, and tetrahydronaphthalene. Homologously bonded (substituted) benzenes may consist of biphenyl, and diphenylether.

The divinylarene dioxide used for preparing the formulations of the present invention may be illustrated generally by general chemical Structures I-IV as follows:

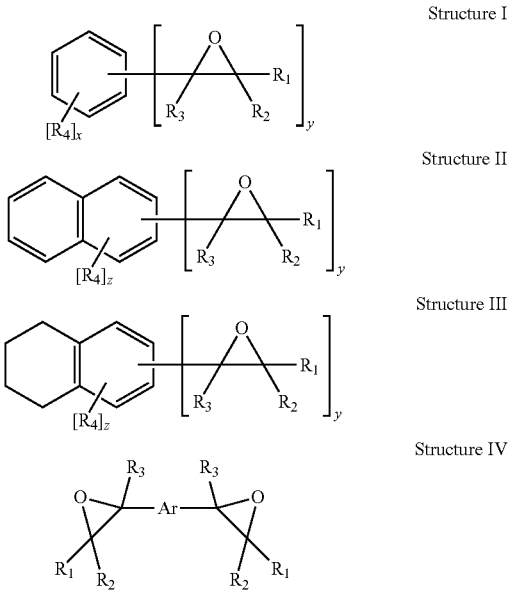

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide used in the present invention may be produced, for example, by the process described in U.S. Patent Provisional Application Ser. No. 61/141,457, filed Dec. 30, 2008, by Marks et al., incorporated herein by reference. The divinylarene dioxide compositions that are useful in the present invention are also disclosed in, for example, U.S. Pat. No. 2,924,580, incorporated herein by reference.

In another embodiment, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In one preferred embodiment of the present invention, the divinylarene dioxide used in the epoxy resin formulation may be for example divinylbenzene dioxide (DVBDO). In another preferred embodiment, the divinylarene dioxide component that is useful in the present invention includes, for example, a divinylbenzene dioxide as illustrated by the following chemical formula of Structure V:

Structure V

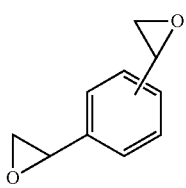

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are class of diepoxides which have a relatively low liquid viscosity but a higher rigidity and crosslink density than conventional epoxy resins.

Structure VI below illustrates an embodiment of a preferred chemical structure of the DVBDO useful in the present invention:

Structure VI

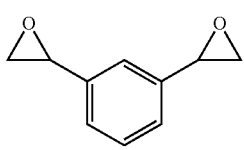

Structure VII below illustrates another embodiment of a preferred chemical structure of the DVBDO useful in the present invention:

Structure VII

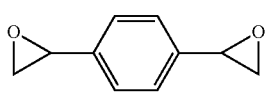

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from 9:1 to 1:9 ratio of meta (Structure VI) to para (Structure VII) isomers. The present invention preferably includes as one embodiment a range of from 6:1 to 1:6 ratio of Structure VI to Structure VII, and in other embodiments the ratio of Structure VI to Structure VII may be from 4:1 to 1:4 or from 2:1 to 1:2.

In yet another embodiment of the present invention, the divinylarene dioxide may contain quantities (such as for example less than about 20 wt %) of substituted arenes and/or arene oxides. The amount and structure of the substituted arenes and/or arene oxides depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene oxide while DEB remains unchanged. The presence of these compounds can increase the epoxide equivalent weight of the divinylarene dioxide to a value greater than that of the pure compound.

In one embodiment, the divinylarene dioxide, for example DVBDO, useful in the present invention comprises a low viscosity liquid epoxy resin. For example, the viscosity of the divinylarene dioxide used in the present invention ranges generally from 0.001 Pa s to 0.1 Pa s in one embodiment, from 0.01 Pa s to 0.05 Pa s in another embodiment, and from 0.01 Pa s to 0.025 Pa s in still another embodiment, at 25° C.

The concentration of the divinylarene dioxide used to prepare the curable divinylarene dioxide resin composition of the present invention as an equivalent ratio r of epoxide to phenol active oxygen and carbon groups as defined above may range generally from 0.01 to 100 in one embodiment, from 0.02 to 50 in another embodiment, from 0.1 to 10 in still another embodiment, and from 0.5 to 5.0 in yet another embodiment.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from 6 to 10 rotational degrees of freedom in one embodiment, from 6 to 9 rotational degrees of freedom in another embodiment, and from 6 to 8 rotational degrees of freedom in still another embodiment.

The phenol compound useful for the curable composition of the present invention, may comprise any conventional monophenol, diphenol, or polyphenol known in the art which bears at least one unsubstituted phenyl carbon atom at a 2-, 4-, or 6-phenolic ring position with respect to any phenolic hydroxyl group in the phenol compound. The numbering of the unsubstituted phenol carbon atoms in the phenols of this invention starts with any carbon bearing a phenolic hydroxyl group and may differ from the numbering used in the chemical name of the phenol. Thus, phenol has one phenolic oxygen atom and three unsubstituted phenolic carbon atoms at the 2-, 4-, and 6-phenolic ring positions, while hydroquinone has two phenolic oxygen atoms and four carbon atoms at the 2-phenolic ring positions.

While not wishing to be limited by theory, it is believed that the novel cure chemistry of the present invention involves alkylation of the phenol at its oxygen and unsubstituted 2-, 4-, and/or 6-phenolic ring positions by the epoxide groups of the divinylarene dioxide. This cure chemistry differs from the prior art cure chemistry of divinylarene dioxides and diphenols and/or polyphenols which forms only ether groups by coupling of an epoxide carbon atom and the polyphenolic oxygen atom.

For example, in one embodiment, the phenol useful in the present invention composition may include any substituted or unsubstituted monophenol or mixtures thereof which bears at least one unsubstituted phenyl carbon atom at a 2-, 4-, or 6-phenolic ring position.

In another embodiment, the monophenol may include for example phenol, o-, m-, or p-alkylphenols such as o-, m-, or p-cresol, nonylphenol, and m-pentadecylphenol, o-, m-, or p-arylphenols such as o-, m-, or p-phenylphenol, hydroxyl-substituted polycyclic aromatic hydrocarbons such as 1- or 2-naphthol, 2,4- or 2,6-alkylphenols such as 2,4- or 2,6-xylenol, or mixtures thereof. Monophenols excluded from this embodiment are those which are substituted at each of the 2-, 4-, and 6-phenolic ring positions, such as 2,4,6-trimethylphenol and 2,4,6-tris(dimethylaminomethyl)phenol.

For example, in one embodiment, the diphenol useful in the present invention may include monomeric or oligomeric diphenols, bisphenols, and mixtures thereof, which bears at least one unsubstituted phenyl carbon atom at a 2-, 4-, or 6-phenolic ring position. In another embodiment, suitable diphenol compounds useful in the present invention composition those which bear at least one unsubstituted phenyl carbon atom at a 2-, 4-, or 6-phenolic ring position as described in U.S. Pat. No. 4,358,578; incorporated herein by reference.

In one preferred embodiment, the diphenols useful in the present invention may include for example any substituted or unsubstituted diphenol which bears at least one unsubstituted phenyl carbon atom at a 2-, 4-, or 6-phenolic ring position such as, hydroquinone, resorcinol, catechol, bisphenol A, bisphenol F, biphenol, thiodiphenol, and a difunctional phenolic hardener such as D.E.H. 80 phenolic resin (an oligomer derived from bisphenol A and bisphenol A diglycidyl ether). D.E.H. is a trademark of The Dow Chemical Company. Diphenols excluded from this embodiment are those which are substituted at each of the 2-, 4-, and 6-phenolic ring positions, such as tetramethylbisphenol A.

For example, in one embodiment, the polyphenol useful in the present invention may include any substituted or unsubstituted polyphenol or mixtures thereof which bears at least one unsubstituted phenyl carbon atom at a 2-, 4-, or 6-phenolic ring position. In one preferred embodiment, polyphenols useful in the present invention may include for example any substituted or unsubstituted polyphenol which bears at least one unsubstituted phenyl carbon atom at a 2-, 4-, or 6-phenolic ring position such as tris(4-hydroxyphenyl)ethane, dicyclopentadiene-phenol adducts (for example SD-1806 DCPD-phenol adduct available from Momentive, Inc.), phenol novolac resins (for example, Rezicure 3000 phenol novolac resin available from SCI), cresol novolac resins (for example SD-1612 o-cresol novolac resin available from Momentive, Inc.), and bisphenol A novolac resins (for example SD-1502 bis A-formaldehyde resin available from Momentive, Inc.). Polyphenols excluded from this embodiment are those which are substituted at each of the 2-, 4-, and 6-phenolic ring positions, such as tris(4-hydroxy-3,5-dimethylphenyl)ethane.

In another embodiment, the phenols of the present invention may bear substituents comprising alkyl, aryl, ether, ester, thiol, sulfide, sulfone, sulfoxide, thioester, halogen, cyano, nitro, 1°-, 2°-, or 3°-amino, carboxyl, or anhydride groups, or mixtures thereof.

The concentration of the phenol used to prepare the curable divinylarene dioxide resin composition of the present invention as an equivalent ratio r of epoxide to phenol active oxygen and carbon groups as defined above may range generally from 0.01 to 100 in one embodiment, from 0.02 to 50 in another embodiment, from 0.1 to 10 in still another embodiment, and from 0.5 to 5.0 in yet another embodiment.

In preparing the curable resin formulation of the present invention, at least one acid compound-related cure catalyst is used to facilitate the reaction of the divinylarene dioxide compound with the phenol. In one embodiment, the catalyst useful in the present invention may include, for example, any of the catalysts described in U.S. Provisional Patent Application Ser. No. 61/556,979, such as for example Bronsted acids, Lewis acids, and mixtures thereof. In another embodiment, the catalysts may include for example a latent alkylating ester such as for example, any of the catalysts described in WO 9518168.

In another embodiment, the latent alkylating ester cure catalyst may include for example the esters of sulfonic acids such as methyl p-toluenesulfonate, ethyl p-toluenesulfonate, and methyl methanesulfonate; esters of α-halogenated carboxylic acids such as methyl trichloroacetate and methyl trifluoroacetate; and esters of phosphonic acids such as tetraethylmethylenediphosphonate; and any combination thereof.

In one preferred embodiment of the present invention, the cure catalysts may include, for example, methyl p-toluenesulfonate, ethyl p-toluenesulfonate, methyl methanesulfonate, methyl trichloroacetate, methyl trifluoroacetate, tetraethylmethylenediphosphonate, and mixtures thereof.

In yet another embodiment, the acid compound-related cure catalyst may include a cationic photoinitiator wherein the formulation is cured using actinic radiation. The photoinitiator, component (b), useful in preparing the curable divinylarene dioxide resin composition of the present invention may be any conventional photoinitiator compounds. For example, the photoinitiator compound useful in the practice of the present invention may include Cyracure UVI6992 and UVI6976 available from The Dow Chemical Company and mixtures thereof. Mixtures of any two or more photoinitiators can also be used in the practice of the present invention. Other suitable photoinitiator compounds useful in the present invention are described in U.S. Pat. Nos. 4,105,806; 4,197,174; 4,201,640; 4,247,472; 4,247,473; 4,161,478; 4,058,400; 4,058,401; 4,138,255; 4,175,972; 4,273,668; 4,173,476; 4,186,108; 4,218,531; and 4,231,951; all of which are incorporated herein by reference.

Photoinitiators that may be used herein may be solutions that contain a photoinitiator or a mixture of photoinitiators and a suitable carrier, or may be 100% solids. Both the solution types and the 100% solid types of photoinitiators and mixtures thereof may be used in the present invention.

Suitable carriers for photoinitiators of the solution type are compounds that are useful for preparing liquid solutions that contain photoinitiators. Examples of photoinitiators that are solutions are UVI-6992 and UVI-6976 available from The Dow Chemical Company. In the case of UVI-6992 and UVI-6976, the carrier can be propylene carbonate. Another example of a photoinitiator that is a solution is triarylsulfonium PF6 benzene free photoinitiator also known as R-Gen BF 1172 available from Chitec; and compounds R-Gen BF 1172. In the case of R-Gen BF 1172, the carrier can be propylene carbonate.

Examples of photoinitiators of the 100% solid type that are useful in the present invention include [4-(octyloxy)phenyl] phenyliodonium hexafluorophospate also known as FP5384; (4-methoxyphenyl)phenyliodonium trifluormethanesulfonate, i.e., triflate also known as FP5311; bis(4-tertiary-butylphenyl)iodonium hexafluoroantimonate also known as FP5034; cyclohexyltosylate also known as FP5102; (4-methyl-4-(trichloro-methyl)-2,5-cyclohexadienone also known as FP5510 available from Hampford Research Inc. and compounds related to the above products; and mixtures thereof; and diphenyliodonium PF6 available from Sigma-Aldrich; and related compounds related to diphenyliodonium PF6, and mixtures thereof.

Other examples of a photoinitiator that is 100% solids include (4-methylphenyl)(4'-isobutylphenyl)iodonium hexafluorophospate also known as Irgacure 250 available from Ciba Specialty Chemicals and related compounds; diarylferrocinium salt hexafluorophospate also known as R-Gen 261; triphenylsulfonium SbF6 also known as Chivacure 548 available from Chitec Technology Company Limited, Taipei City, Taiwan, Republic of China (Chitec) and related compounds; and mixtures thereof.

Some preferred examples of the photoinitiator compounds useful in the present invention may include for example compounds that contain diphenyl(phenyl-thiophenyl)sulfonium cation; bis[4-(diphenylsulfonio)phenyl]sulfide bis cation; triphenylsulfonium cation; [4-(octyloxy)phenyl]phenyliodonium cation; (4-methoxyphenyl)phenyliodonium cation; bis (4-tertiary-butylphenyl)iodonium cation; (4-methylphenyl) (4'-isobutylphenyl)iodonium cation; hexafluoroantimonate ($SbF_6^-$) anion, $SbF_x(OH)_y$,— where x+y=6 anion; hexafluorophosphate ($PF_6^-$) anion; tetrafluoroborate ($BF_4^-$) anion; tetrakis(pentafluorophenyl)borate anion; and mixtures thereof.

Other preferred embodiments of photoiniators useful in the present invention are disclosed in U.S. Pat. Nos. 7,671,081; 7,598,401; 7,335,782; 7,294,723; and 7,101,998; and U.S. Patent Application Publication Nos. 20080081917A1, 20080268169A1, and 20090023829A1 incorporated herein by reference. Yet other preferred embodiments of the photoiniators useful in the present invention are disclosed in U.S. Pat. Nos. 7,671,081; 7,598,401; 7,335,782; 7,294,723; and 7,101,998, incorporated herein by reference.

Some of the most preferred embodiments of the photoinitiators useful in the present invention contain diphenyl(phenylthiophenyl)sulfonium; bis[4-(diphenylsulfonio)phenyl] sulfide; $SbF_6^-$; $SbF_x(OH)_y$— where x+y=6; $PF_6^-$; and photoinitiators disclosed in U.S. Pat. Nos. 7,671,081; 7,598, 401; 7,335,782; 7,294,723; and 7,101,998, incorporated herein by reference; and mixtures thereof.

The concentration of the acid compound-related cure catalyst used in the present invention is used in an amount sufficient to advance (i.e., catalyze) the cure reaction of the divinylarene dioxide and the phenol compounds. For example, the concentration of the catalyst may range generally from 0.01 wt % to 20 wt % in one embodiment, from 0.1 wt % to 10 wt % in another embodiment, from 1 wt % to 10 wt % in still another embodiment, and from 2 wt % to 10 wt % in yet another embodiment. If the catalyst concentration is less than the concentrations described above, the cure reaction is insufficient to allow the formulation to cure; and if the catalyst concentration is more than the concentrations described above, then the cure reaction creates a runaway reaction, or the cure reaction detrimentally affects the properties of the resulting thermoset. For example, an insufficient rate of cure or improper cure could create defects such as bubbles and/or voids in the resulting thermoset.

As an illustration of one embodiment of the composition of the present invention, the composition may comprise a divinylarene dioxide at a concentration of from 1 wt. % to 99 wt. %, a phenol at a concentration of from 1 wt. % to 99 wt. %, and an acid catalyst at a concentration of from 0.01 wt. % to 20 wt. %; and cured products derived from the above compositions.

Various optional compounds can be added to the curable composition of the present invention such as for example compounds that are normally used in resin formulations known to those skilled in the art. For example, the optional components may comprise compounds that can be added to the composition to enhance application properties (e.g. surface tension modifiers or flow aids), reliability properties (e.g. adhesion promoters), the reaction rate, the selectivity of the reaction, and/or the catalyst lifetime.

For example, the optional compounds that may be added to the curable composition of the present invention may include a solvent to lower the viscosity of the formulation further, other epoxy resins different from the divinylarene dioxide (i.e. aromatic and aliphatic glycidyl ethers, cycloaliphatic epoxy resins), other curing agents, fillers, pigments, toughening agents, flow modifiers, adhesion promoters, diluents, stabilizers, plasticizers, catalysts, catalyst de-activators, flame retardants, and mixtures thereof.

The concentration of the optional additives useful in the present invention may range generally from 0 wt % to 90 wt % in one embodiment, from 0.01 wt % to 80 wt % in another embodiment, from 0.1 wt % to 65 wt % in still another embodiment, and from 0.5 wt % to 50 wt % in yet another embodiment.

In one embodiment of the present invention, an epoxy resin which is different from the divinylarene dioxide, may be optionally used in the curable composition of the present invention. The epoxy resin may be any epoxy resin component or combination of two or more epoxy resins known in the art such as epoxy resins described in Lee, H. and Neville, K., *Handbook of Epoxy Resins*, McGraw-Hill Book Company, New York, 1967, Chapter 2, pages 2-1 to 2-27, incorporated herein by reference. Particularly suitable other epoxy resins known in the art include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy resin may also be selected from commercially available products such as for example, D.E.R. 331®, D.E.R.332, D.E.R. 354, D.E.R. 580, D.E.N. 425, D.E.N. 431, D.E.N. 438, D.E.R. 736, or D.E.R. 732 epoxy resins available from The Dow Chemical Company.

Generally, the amount of other epoxy resin, when used in the present invention, may be for example, from 0 equivalent % to 99 equivalent % in one embodiment, from 0.1 equivalent % to 95 equivalent % in another embodiment; from 1 equivalent % to 90 equivalent % in still another embodiment; and from 5 equivalent % to 80 equivalent % of the total epoxides in yet another embodiment.

In another embodiment of the present invention, an optional curing agent useful for the curable composition of the present invention may comprise any conventional curing agent known in the art. The curing agent, (also referred to as a hardener or cross-linking agent) useful in the curable composition, may be selected, for example, from those curing agents well known in the art including, but are not limited to, anhydrides, carboxylic acids, amine compounds, phenolic compounds, mercaptans, or mixtures thereof.

Examples of optional curing agents useful in the present invention may include any of the co-reactive or catalytic curing materials known to be useful for curing epoxy resin based compositions. Such co-reactive curing agents include, for example, polyamine, polyamide, polyaminoamide, dicyandiamide, polymeric thiol, polycarboxylic acid and anhydride, or any combination thereof. Suitable catalytic curing agents include tertiary amine, quaternary ammonium halide, Lewis acids such as boron trifluoride, or any combination thereof. Other specific examples of co-reactive curing agent include diaminodiphenylsulfone, styrene-maleic acid anhydride (SMA) copolymers; or any combination thereof. Among the conventional co-reactive epoxy curing agents, amines, amino or amido containing resins, and phenolics are preferred embodiments.

Another class of optional curing agents useful in the present invention is polyols. The polyol optional curing agent useful for the curable composition of the present invention may comprise any conventional polyol known in the art. For example, the polyol optional curing agent may include any conventional polyol known in the art and particularly any compound or mixtures of compounds containing two or more hydroxyl groups. For example, the polyol optional curing agent useful in the curable composition, may be selected from, but are not limited to, diols, glycols, triols, tetrols, pentols, hexols, and mixtures thereof.

In one preferred embodiment, the polyol optional curing agent may include for example alkyl and alkyl ether polyols, polymeric polyols such as polyether polyols, polyester polyols (including polycaprolactone polyols), polycarbonate polyols, and polyalkylidine polyols, and mixtures thereof.

Generally, the amount of optional curing agent, when used in the present invention, may be for example, from 0 equivalent % to 99 equivalent % in one embodiment, from 0.1 equivalent % to 90 equivalent % in another embodiment; from 1 equivalent % to 75 equivalent % in still another embodiment; and from 5 equivalent % to 50 equivalent % of the total curing agent functional groups (phenol and optional curing agent) in yet another embodiment.

In another embodiment, the curable composition of the present invention comprises the coupled reaction product of at least one divinylarene dioxide and at least one phenol, wherein the phenol is unsubstituted at a 2-, 4-, or 6-phenolic ring position, using at least one coupling catalyst, wherein the resulting coupled, curable composition is soluble in organic solvents and is curable in the presence of at least one acid compound-related cure catalyst. The coupled, curable composition of the present invention comprises coupled reaction products having partial or complete conversion of the at least one phenol and partial conversion of the at least one divinylarene dioxide. The coupled, curable composition of the present invention comprises coupled reaction products which are completely soluble in at least one organic solvent. The coupled, curable composition of the present invention may be liquids or solids and may have a glass transition temperature ($T_g$) between −70° C. and 150° C. The coupled, curable composition of the present invention which is liquid at 25° C. has a viscosity at 25° C. between 20 mPa-s and 10,000 Pa-s. The coupled, curable composition of the present invention which is solid at 25° C. has a viscosity above its melting or softening point of less than about 10,000 Pa-s.

In another embodiment of the present invention, an optional coupling catalyst may be used to catalyze the coupling of the at least one divinylarene dioxide and the at least one phenol, wherein the phenol is unsubstituted at a 2-, 4-, or 6-phenolic ring position prior to curing the resulting coupled composition in the presence of at least one acid compound-related cure catalyst and, optionally, other ingredients as needed. The optional coupling catalyst useful in the curable composition may be selected, for example, from those epoxide-phenol coupling catalysts well known in the art including, but not limited to, alkali metal hydroxides, alkaline earth metal hydroxides, tertiary amines, quaternary ammonium salts, quaternary phosphonium salts, or mixtures thereof. Such coupling catalysts may include, for example, sodium hydroxide, potassium hydroxide, magnesium hydroxide, calcium hydroxide, triethylamine, benzyldimethylamine, N-methylmorpholine, 2-phenylimidazole, tetrabutylammonium hydroxide, tetrabutylphosphonium bromide, ethyltriphenylphosphonium acetate, or any combination thereof. The acid compound-related cure catalyst may also be used to couple the divinylarene dioxide and the phenol compounds prior to cure. Preferred coupling catalysts are quaternary phosphonium salts such as, for example, tetrabutylphosphonium bromide.

The concentration of the optional coupling catalyst used in the present invention is used in an amount sufficient to advance (i.e., catalyze) the coupling reaction of the divinylarene dioxide and the phenol compounds. For example, the concentration of the optional coupling catalyst may range generally from 0.01 wt % to 20 wt % in one embodiment, from 0.1 wt % to 10 wt % in another embodiment, from 1 wt % to 10 wt % in still another embodiment, and from 2 wt % to 10 wt % in yet another embodiment.

The process for preparing the formulation or composition of the present invention includes admixing (a) at least one divinylarene dioxide; (b) at least one phenol, wherein the phenol is unsubstituted at a 2-, 4-, or 6-phenolic ring position; (c) at least one acid compound-related cure catalyst; and (d) optionally, other ingredients as needed. The compounds may be mixed in any order. For example, the preparation of the curable resin formulation of the present invention is achieved by blending with or without vacuum in a Ross PD Mixer (Charles Ross), the divinylbenzene dioxide, a phenol, an acid compound-related cure catalyst, and optionally any other desirable additives. Any of the above-mentioned optional assorted formulation additives, for example an additional epoxy resin different from the divinylarene dioxide, may also be added to the composition during the mixing or prior to the mixing to form the composition.

All the components of the epoxy resin formulation are typically mixed and dispersed at a temperature enabling the preparation of an effective epoxy resin composition having the desired balance of properties for a particular application. For example, the temperature during the mixing of all components may be generally from −10° C. to 100° C. in one embodiment, and from 0° C. to 50° C. in another embodiment. Lower mixing temperatures help to minimize reaction of the resin and hardener components to maximize the pot life of the formulation.

The process for preparing the formulation or composition of the present invention may optionally include admixing (a) at least one divinylarene dioxide; (b) at least one phenol, wherein the phenol is unsubstituted at a 2-, 4-, or 6-phenolic ring position; (c) at least one coupling catalyst; and (d) optionally, other ingredients, and allowing the divinylarene dioxide and phenol to couple to form a coupled, curable composition.

For example, in one embodiment, the process of coupling the compositions of the present invention comprises exposing the composition to a temperature between 0° C. to 300° C. for a period of from 0.01 hour to 24 hours. The process of coupling the composition of the present invention may be conducted at reaction times and temperatures to achieve a targeted degree of phenol and/or divinylarene dioxide conversion or to achieve a targeted property, such as for example viscosity and/or $T_g$.

Preferably, the curing catalyst used to prepare the coupled, curable composition of the present invention is different from the coupling catalyst and is added after cooling the coupled, curable composition to less than about 100° C.

The blended compound is typically stored at sub-ambient temperatures to maximize shelf life. Acceptable temperature ranges are for example from −100° C. to 50° C. in one embodiment, from −70° C. to 40° C. in another embodiment, and from −50° C. to 30° C. in still another embodiment. As an illustration of one embodiment, the temperature at which the blended formulation is stored may be about 0° C.

The blended formulation can then be applied via a number of methods depending on the application. For example, typical application methods include casting, injection molding, extrusion, rolling, and spraying.

The curing of the curable composition may be carried out at a predetermined temperature and for a predetermined period of time sufficient to cure the composition. The curing may be dependent on the components used in the formulation. As aforementioned, the rate of cure may also depend on the concentration of the cure catalyst. Since DVBDO tends to form bubbles during curing which can lead to voids in a cured composition, the curing is performed such that the rate of cure is at a sufficient rate to cure without creating defects such as bubbles and/or voids where undesirable. In addition, the rate of cure is performed to avoid a runaway reaction.

For example, in one embodiment, the process of curing the compositions of the present invention comprises exposing the composition to a temperature between −50° C. to 500° C. for a period of from 0.01 hour to 24 hours.

In another embodiment, the temperature of curing the formulation may be generally from −50° C. to 500° C.; from 0° C. to 400° C. in another embodiment; and from 25° C. to 300° C. in still another embodiment.

In yet another embodiment, the curable formulation comprising a cationic photoinitiator may be cured using actinic radiation including UV radiation, visible light, and electron beams. UV lamps typically contain a high purity quartz envelop or tube. UV lamps include medium pressure and high pressure mercury vapor lamps including lamps containing optional additives including iron halide and gallium halide and mixtures thereof. UV lamps include lamps that contain xenon chloride.

The UV lamps may be powered using electrodes attached to each end of the lamp or using microwaves that impinge onto the quartz envelop of an electrodeless lamp. Electric arcs and microwaves are use to power the UV lamps and cause mercury to form a plasma and mercury plasma is known to emit radiation. Microwave powered lamps include the UV lamps offered by Fusion UV Systems, Inc. The power level required to operate UV lamps are typically described by the watts (W) per linear length of the lamp for example 40 W/cm, 80 W/cm, 120 W/cm, 160 W/cm, 200 W/cm, 240 W/cm and 300 W/cm. Typically, higher power lamps can process inks and coatings at higher speeds which improves productivity however higher power lamps require more energy to operate and are typically more expensive.

UV lamps typically emit visible light and UV and infra-red (IR) radiation. The IR can be managed using water or forced air to cool the lamp or the lamp and the substrate. Reflectors are typically used to direct and focus as desired more of the useful energy emitted by the lamp onto the ink on substrate. Reflectors include elliptical and parabolic reflectors. Dichroic reflectors may be used to direct and focus as desired more of the useful energy and to absorb some of the IR.

Electron beams (EB) include high energy electron beams emitted from an appropriate filament and accelerated toward the substrate. Electron beam processing equipment includes products available from Advanced Electron Beams. The ink formulations of the present invention may be processed using electron beams.

Generally the curing time may be chosen between 0.01 hour to 24 hours in one embodiment; 1 minute to 4 hours in another embodiment, between 5 minutes to 2 hours in still another embodiment, and between 10 minutes to 1.5 hours in yet another embodiment. Below a period of time of 0.01 hour, the time may be too short to ensure sufficient reaction under conventional processing conditions; and above 24 hours, the time may be too long to be practical or economical.

The divinylarene dioxide of the present invention such as divinylbenzene dioxide (DVBDO), which is the epoxy resin component of the curable composition of the present invention, may be used as the sole resin to form the epoxy matrix in the final formulation; or the divinylarene dioxide resin may be used in combination with another epoxy resin that is different from the divinylarene dioxide as the epoxy component in the final formulation. For example the different epoxy resin may be used as an additive diluent.

In one embodiment, the use of divinylbenzene dioxide such as DVBDO imparts improved properties to the curable composition and the final cured product over conventional glycidyl ether, glycidyl ester or glycidyl amine epoxy resins. The DVBDO's unique combination of high reactivity with phenols using acid compound-related catalysts, low viscosity in the uncured state, and high $T_g$ after cure due to the rigid DVBDO molecular structure and increase in cross-linking density enables a formulator to apply new formulation strategies. In addition, the ability to cure the epoxy resin with an expanded hardener range as embodied by the phenol curing agents of the present invention offers the formulator significantly improved formulation latitude over other types of epoxy resins known in the art.

As is well known in the art, curable compositions are converted upon curing from a liquid, paste, or powder formulation into a durable solid cured composition. The resulting cured composition of the present invention displays such excellent properties, such as for example, solvent resistance and heat resistance. The properties of the cured compositions of the present invention may depend on the nature of the components of the curable formulation and the cure conditions used in its preparation. The cured product (i.e. the cross-linked product made from the curable composition) of the present invention shows several improved properties over conventional epoxy cured resins.

For example, the cured product of the present invention may have a glass transition temperature ($T_g$) of from 100° C. to 400° C. in one embodiment, between 115° C. and 400° C. in another embodiment, and between 125° C. and 400° C. in still another embodiment, as measured via ASTM D3418, ASTM D4065, ASTM D4440, or ASTM D5279.

The curable composition of the present invention may be used to manufacture coatings, films, adhesives, binders, sealants, laminates, composites, electronics, and castings.

EXAMPLES

The following examples and comparative examples further illustrate the present invention in detail but are not to be construed to limit the scope thereof.

The following materials and the various terms and designations are used in the Examples:

Divinylbenzene dioxide (DVBDO) was used in the Examples as a mixture of meta and para isomers in a ratio of about 2:1. The DVBDO used had a molecular weight of 162 g/mol and an equivalent weight of 81 g/eq.

The following phenols were used in the Examples: phenol (94 g/mol, 23.5 g/eq.), p-cresol (108 g/mol, 36 g/eq.), nonylphenol (NLP, mixed nonyl and ring position isomers, 220 g/mol, 73 g/eq.), and m-pentadecylphenol (PDP, 304 g/mol, 76 g/eq.).

2,4,6-Tris(dimethylaminomethyl)phenol commercially available from Air Products, Inc. (Ancamine K-54), commonly known as DMP-30, was used in a Comparative Example.

The following curing catalysts were used in the Examples: Cycat 600 (70 wt. % dodecylbenzenesulfonic acid in isopropanol commercially available from Cytec, Inc.), methyl p-toluenesulfonate (MPTS), ethyl p-toluenesulfonate (EPTS), methyl methanesulfonate (MMS), methyl trichloroacetate (MTCA), methyl trifluoroacetate (MFTA), and tetraethylmethylenediphosphonate (TEMDP).

The following coupling catalysts were used in the Examples: MPTS, benzyldimethylamine (BDMA), tetrabutyphosphonium bromide (TBPB), ethyltripheny-1phosphonium acetate (A-1), ethyltriphenylphosphonium bromide (B-1), and ethyltriphenyl-phosphonium iodide (I-1).

The following optional components were used in the Examples: Acclaim 1000 polypropylene glycol (PPO 1000), Terathane 1000 polytetramethylene glycol (PTMO 1000), Unidyme 22 dimer acid, Paraloid EXL 2650A core-shell rubber (CSR), and Hypro 1300×8 carboxyl-terminated butadiene-acrylonitrile liquid rubber (CTBN).

The following standard analytical equipments and methods are used in the Examples:

Glass Transition Temperature Measurements

In the following examples glass transition temperature ($T_g$) is measured either by differential scanning calorimetry (DSC) as the temperature at the half-height of the heat flow curve using a temperature scan rate of 10° C./minute or by dynamic mechanical analysis (DMA) as the peak tan delta using a temperature scan rate of 5° C./minute. The value r is the ratio of epoxide/phenol equivalents in the formulation.

Epoxide Equivalent Weight

The epoxide equivalent weight of the divinylarene dioxide is defined as its molecular weight of divided by its functionality, which is taken as the number of epoxide groups per molecule. Thereby, DVBDO has a molecular weight of 162 g/mole, a functionality of 2, and an equivalent weight of 81 g/eq.

Equivalent Weight of the Phenol

The equivalent weight of the phenol of the present invention is defined as its molecular weight divided by its functionality, which is taken as the sum of the number of phenolic groups and the unsubstituted phenolic ring carbons at a 2-, 4-, and 6-phenolic ring positions per molecule. Thereby, phenol has a molecular weight of 94 g/mole, a functionality of 4, and an equivalent weight of 23.5 g/eq. and PDP has a molecular weight of 304 g/mole, a functionality of 4, and an equivalent weight of 76 g/eq.

Mechanical Properties

Tensile modulus (E), break stress ($\sigma_b$), and elongation at break ($\epsilon_b$) were measured on Type 1 specimens using ASTM D638-03. Fracture toughness ($K_{1C}$ was measured using compact tension specimens using ASTM D-5045.

Conversion of Divinylarene Dioxide and Phenol

The conversion of the divinylarene dioxide and the phenol was determined by high performance liquid chromatography using an Agilent 1100 Liquid Chromatograph system connected to a diode array detector operated at 228 nm and fitted with a Hypersil-Keystone 250×4.6 mm, 3 micron ODS column operated at 40° C. A solvent elution program starting at 40% of acetonitrile and 60% of 5% acetonitrile in water to 75% acetonitrile and 25% of 5% acetonitrile in water over 20 minutes (min) at a flowrate of 1 ml/min was used in the analysis of 10 microliter injections of 0.05 wt % samples dissolved in acetonitrile. Conversion of the respective components was calculated by the change in area % of the analytes in the reacted mixture to that of an unreacted mixture.

Viscosity

Viscosity was measured at 25° C. using an AR2000 Rheometer from TA Instruments fitted with a parallel plate fixture operated at a shear rate of 10 s$^{-1}$.

Example 1 and Comparative Example A

To a 20 mL vial were added 5.0 g DVBDO, 1.1 g of either p-cresol (Example 1) or DMP-30 (Comparative Example A), and 0.03 g Cycat 600 catalyst. Each mixture was stirred for 1 min and then poured into an aluminum dish to be cured for 30 min each at 60° C., 100° C., 120° C., 140° C., and 160° C. The formulation of Example 1 cured to a hard solid having a $T_g$ of 111° C. The formulation of Comparative Example A remained liquid and did not cure.

Examples 2-17

To a 20 or 50 mL vial were added DVBDO, phenol, and catalyst in the amounts shown in Table I. Each mixture was stirred for 1 min and then poured into an aluminum dish to be cured in an oven using the indicated cure schedule. The resulting cured materials were hard, tack-free solids having a high $T_g$.

TABLE I

| | DVBDO | Phenol | | Catalyst | | Cure | | DSC $T_g$ |
|---|---|---|---|---|---|---|---|---|
| Example | (g) | type | (g) | type | (g) | Schedule[1] | r | (° C.) |
| 2 | 4.500 | phenol | 0.440 | MPTS | 0.059 | a | 3.0 | 163 |
| 3 | 2.000 | p-cresol | 0.444 | Cycat 600 | 0.012 | b | 2.0 | 212 |
| 4 | 3.051 | p-cresol | 0.469 | Cycat 600 | 0.017 | b | 2.9 | 222 |
| 5 | 3.012 | p-cresol | 0.349 | Cycat 600 | 0.016 | b | 3.8 | 224 |
| 6 | 22.000 | p-cresol | 3.290 | MPTS | 0.310 | c | 3.0 | 200 |
| 7 | 22.000 | p-cresol | 3.280 | EPTS | 1.070 | c | 3.0 | 211 |
| 8 | 4.510 | p-cresol | 0.660 | MMS | 0.025 | c | 3.0 | 173 |
| 9 | 3.025 | NLP | 0.901 | Cycat 600 | 0.039 | d | 3.0 | 182 |
| 10 | 3.038 | NLP | 0.552 | Cycat 600 | 0.034 | d | 5.0 | 211 |

TABLE I-continued

| Example | DVBDO (g) | Phenol type | (g) | Catalyst type | (g) | Cure Schedule[1] | r | DSC $T_g$ (° C.) |
|---|---|---|---|---|---|---|---|---|
| 11 | 2.016 | PDP | 1.255 | Cycat 600 | 0.016 | e | 1.5 | 125 |
| 12 | 2.019 | PDP | 0.837 | Cycat 600 | 0.015 | e | 2.3 | 151 |
| 13 | 2.565 | PDP | 0.789 | Cycat 600 | 0.017 | e | 3.1 | 154 |
| 14 | 2.507 | PDP | 0.629 | Cycat 600 | 0.016 | e | 3.7 | 162 |
| 15 | 5.02 | p-cresol | 0.74 | MTCA | 0.06 | b | 3.0 | 47 |
| 16 | 5.02 | p-cresol | 0.75 | MFCA | 0.06 | b | 3.0 | 46 |
| 17 | 5.01 | p-cresol | 0.76 | TEMDP | 0.06 | b | 3.0 | 172 |

[1]Cure Schedules:

a. 30 minutes each at 60° C., 80° C., 90° C., 100° C., 105° C., 110° C., 115° C., 120° C., and 150° C., then 60 minutes each at 200° C. and 225° C.

b. 30 minutes each at 60° C., 70° C., 80° C., 90° C., 100° C., 120° C., 140° C., 160° C., 180° C., and 200° C.

c. 30 minutes each at 80° C., 100° C., 110° C., 120° C., 130° C., 140° C., 150° C., 160° C., 175° C., 200° C., 225° C.

d. 30 minutes each at 80° C., 90° C., and 100° C., 60 minutes at 120° C., 30 minutes at 140° C., 105 minutes at 160° C., 15 minutes at 170° C., and 60 minutes at 180° C.

e. 30 minutes each at 60° C., 70° C., 80° C., 90° C., 100° C., 120° C., 140° C., 160° C., 180° C., and 200° C.

Examples 18 and 19

Formulations similar to Examples 3 and 5 were placed on a Rheometrics parallel plate rheometer and heated at 5° C./minute to record viscosity and gel point versus time and temperature. Example 18 shows that the more reactive Bronsted acid catalyst Cycat 600 gels in 19 min, whereas in Example 19 the latent alkylating ester catalyst MPTS gels in 27 min.

TABLE II

| Example | DVBDO (g) | Phenol type | (g) | Catalyst type | (g) | r | Viscosity at 30° C. (mPa-s) | Gel Time (min) |
|---|---|---|---|---|---|---|---|---|
| 18 | 4.50 | p-cresol | 0.67 | Cycat 600 | 0.05 | 3.0 | 9 | 19 |
| 19 | 4.50 | p-cresol | 0.67 | MPTS | 0.05 | 3.0 | 9 | 27 |

Example 20

To a round bottomed flask were added 87.85 g (0.542 mole, 1.085 eq.) DVBDO, 12.93 g (0.121 mole, 0.364 eq., r=3.0)p-cresol, and 0.24 g (0.23 wt. %) MPTS. The mixture was mechanically stirred for 2 min, degassed under hard vacuum with stirring for 10 min, then poured into an Al mold assembly having a ⅛" (3.2 mm) spacer. The filled mold assembly was placed in an air recirculating oven and cured for 30 min each at 60° C., 80° C., 90° C., 100° C., 105° C., 110° C., 115° C., 120° C., and 150° C. to give a rigid thermoset. DMA shows $T_g$ of 149° C.

Examples 21-29

Specimens of Example 20 were cut into samples for DMA and were post-cured in an air recirculating oven at the times and temperatures (cumulative) shown in Table III.

TABLE III

| Example No. | Post Cure Time (min.) | Post-Cure Temperature (° C.) | DMA $T_g$ (° C.) |
|---|---|---|---|
| 21 | 60 | 160 | 157 |
| 22 | 60 | 170 | 201 |
| 23 | 30 | 180 | 214 |
| 24 | 60 | 190 | 225 |
| 25 | 30 | 200 | — |
| 26 | 60 | 225 | 278 |
| 27 | 30 | 250 | 285 |
| 28 | 30 | 275 | 317 |
| 29 | 30 | 300 | 372 |

Examples 30-35

Example 29 was repeated with the addition of selected optional components and an initial post-cure at 140° C. for 16 hours (hr) to give cured compositions having properties as shown in Table IV.

TABLE IV

| Example | Optional Component | (wt. %) | DMA $T_g$ (° C.) | E (MPa) | $\sigma_b$ (MPa) | $\epsilon_b$ (%) | $K_{1C}$ (MPa-m$^{0.5}$) |
|---|---|---|---|---|---|---|---|
| 30 | none | — | 377 | 3590 | 47 | 1.4 | 0.39 |
| 31 | PPO 1000 | 10 | 369 | 3204 | 45 | 1.6 | 0.46 |
| 32 | PTMO 1000 | 5 | 371 | 3375 | 43 | 1.4 | 0.37 |
| 33 | dimer acid | 10 | 365 | 3451 | 41 | 1.3 | 0.48 |
| 34 | CSR | 5 | 361 | 3076 | 42 | 1.5 | 0.45 |
| 35 | CTBN | 5 | 346 | 3397 | 58 | 1.9 | 0.43 |

Examples 36-44

Example 2 was repeated using the amounts of DVBDO, p-cresol, and MPTS as shown in Table V. The liquid samples were cured for 30 min each at 80° C., 90° C., 100° C., 105° C., 110° C., 115° C., 120° C., 130° C., 140° C., and 150° C., with Example 36 cured for an additional 60 min each at 160° C. and 170° C., to give a hard, glassy solid, except for Example 36 having r=0.1 which formed a semi-solid, and were analyzed by DSC.

TABLE V

| Example | DVBDO (g) | p-cresol (g) | MPTS (g) | r | $T_g$ (° C.) |
|---|---|---|---|---|---|
| 36 | 1.99 | 8.90 | 0.0123 | 0.1 | 22 |
| 37 | 3.23 | 7.11 | 0.0124 | 0.2 | 40 |
| 38 | 4.22 | 6.21 | 0.0108 | 0.3 | 59 |
| 39 | 4.99 | 5.57 | 0.0108 | 0.4 | 59 |
| 40 | 10.00 | 8.90 | 0.0188 | 0.5 | 54 |
| 41 | 15.00 | 3.31 | 0.0250 | 2.0 | 123 |
| 42 | 17.00 | 1.96 | 0.0480 | 4.0 | 139 |
| 43 | 17.50 | 1.62 | 0.0587 | 5.0 | 134 |
| 44 | 10.00 | 0.44 | 0.0540 | 10.0 | none$^a$ |

$^a$No $T_g$ observed by DSC.

Examples 45-75

To a round bottomed flask were added 90 g (0.556 mole, 1.11 eq.) DVBDO, 13.42 g (0.124 mole, 0.373 eq., r=3.0) p-cresol, and coupling catalyst type and amount as shown in Table VI. The mixture was mechanically stirred while heating to various temperatures for various times (cumulative for each catalyst type) with samples removed for analysis having the indicated properties.

TABLE VI

| | Catalyst | | Reaction Temperature and Time | | Viscosity | % Conversion | |
|---|---|---|---|---|---|---|---|
| Example | (type) | (wt. %) | (° C.) | (min) | (Pa-s @ 25° C.) | p cresol | DVBDO |
| 45 | MPTS | 0.24 | 100 | 60 | 0.015 | 17 | 0 |
| 46 | | | 125 | 60 | 0.088 | 40 | 21 |
| 47 | | | 130 | 60 | 2.584 | 60 | 44 |
| 48 | | | 135 | 90 | 84.196 | 70 | 58 |
| 48 | BDMA | 1.00 | 125 | 50 | solid | 87 | 81 |
| 50 | | | 130 | 60 | " | 92 | 97 |
| 51 | | | 135 | 9 | " | 93 | 99 |
| 52 | | | 140 | 26 | " | 96 | 99 |
| 53 | TBPB | 1.00 | 100 | 60 | 0.025 | 65 | 28 |
| 54 | | | 125 | 60 | 0.049 | 100 | 36 |
| 55 | | | 130 | 60 | 0.056 | 100 | 38 |
| 56 | | | 135 | 60 | 0.061 | 100 | 38 |
| 57 | | | 140 | 60 | 0.067 | 100 | 41 |
| 58 | | | 145 | 50 | 0.064 | 100 | 43 |
| 59 | | | 150 | 70 | 0.073 | 100 | 46 |
| 60 | | | 175 | 60 | 0.095 | 100 | 59 |
| 61 | | | 200 | 50 | 0.526 | 100 | 77 |
| 62 | | | 200 | 110 | 35.57 | 100 | 78 |
| 63 | A-1 | 1.00 | 100 | 60 | 0.046 | 96 | 21 |
| 64 | | | 110 | 15 | 0.046 | 96 | 20 |
| 65 | | | 120 | 15 | 0.046 | 98 | 23 |
| 66 | | | 125 | 60 | 0.051 | 100 | 25 |
| 67 | B-1 | 1.00 | 100 | 60 | 0.035 | 73 | 16 |
| 68 | | | 125 | 60 | 0.051 | 98 | 19 |
| 69 | | | 125 | 105 | 0.047 | 98 | 21 |
| 70 | I-1 | 1.00 | 100 | 60 | | 68 | 17 |
| 71 | | | 125 | 60 | | 94 | 23 |
| 72 | | | 135 | 60 | 0.047 | 94 | 23 |
| 73 | | | 150 | 60 | | 94 | 24 |
| 74 | | | 175 | 60 | 0.079 | 94 | 29 |
| 75 | | | 200 | 25 | 0.177 | 94 | 41 |

Example 76

Example 66 was repeated on a 350 g scale to give a coupled product having a viscosity at 25° C. of 0.0463 Pa-s. To this material was added 3.5 g MPTS and the mixture was degassed and molded as described for Example 30, except for an additional 30 min cure at 150° C. (1 hr total). DMA of the resulting thermoset shows a $T_g$ of 395° C.

The invention claimed is:

1. A curable composition comprising: (a) at least one divinylarene dioxide; (b) at least one phenol, wherein the phenol is unsubstituted at a 2-, 4-, or 6-phenolic ring position; and (c) at least one cure catalyst selected from the group consisting of methyl p-toluenesulfonate, ethyl p-toluenesulfonate, methyl methanesulfonate, methyl trichloroacetate, methyl trifluoroacetate, and tetraethylmethylenediphosphonate.

2. The composition of claim 1, wherein the at least one divinylarene dioxide comprises divinylbenzene dioxide.

3. The composition of claim 1, wherein the at least one phenol is selected from the group consisting of at least one monophenol, at least one diphenol, at least one polyphenol, and mixtures thereof.

4. The composition of claim 3, wherein the at least one monophenol is selected from the group consisting of phenol, o-cresol, m-cresol, p-cresol, nonylphenol, m-pentadecylphenol, o-phenylphenol, m-phenylphenol, p-phenylphenol, 1-naphthol, 2-naphthol, 2,4-xylenol, 2,6-xylenol, and mixtures thereof; wherein the at least one diphenol is selected from the group consisting of hydroquinone, resorcinol, catechol, bisphenol A, bisphenol F, biphenol, thiodiphenol, difunctional phenolic hardeners, and mixtures thereof; and wherein the at least one polyphenol is selected from the group consisting of tris(4-hydroxyphenyl)ethane, dicyclopentadiene-phenol adducts, phenol novolac resins, cresol novolac resins, bisphenol A novolac resins, and mixtures thereof.

5. The composition of claim 1, wherein the at least one divinylarene dioxide and the at least one phenol are present in amounts yielding an equivalent ratio of from 0.01 to 100; and wherein the at least one cure catalyst is present in an amount of from 0.01 to 20 wt. %, based on the overall composition.

6. The composition of claim 1, further comprising a filler, a reactive diluent, a flexibilizing agent, a processing aide, a toughening agent, or a mixture thereof.

7. A process for preparing the curable composition according to claim 1, comprising: admixing (a), (b), and (c).

8. A process for preparing a cured resin comprising curing the composition of claim 1.

9. A cured article prepared by the process of claim 8.

10. A curable composition comprising: (I) a reaction product of (i) at least one divinylarene dioxide and (ii) at least one phenol, wherein the phenol is unsubstituted at a 2-, 4-, or 6-phenolic ring position; and (II) at least one cure catalyst selected from the group consisting of methyl p-toluenesulfonate, ethyl p-toluenesulfonate, methyl methanesulfonate, methyl trichloroacetate, methyl trifluoroacetate, and tetraethylmethylenediphosphonate; wherein the reaction product (I) is formed in the presence of at least one coupling catalyst.

11. A process for preparing the curable composition according to claim 10, comprising admixing (I) and (II).

12. A process for preparing a cured resin comprising curing the composition of claim 10.

13. A cured article prepared by the process of claim 12.

* * * * *